(No Model.)
F. M. BACON.
FODDER PRESS.
No. 252,922. Patented Jan. 31, 1882.
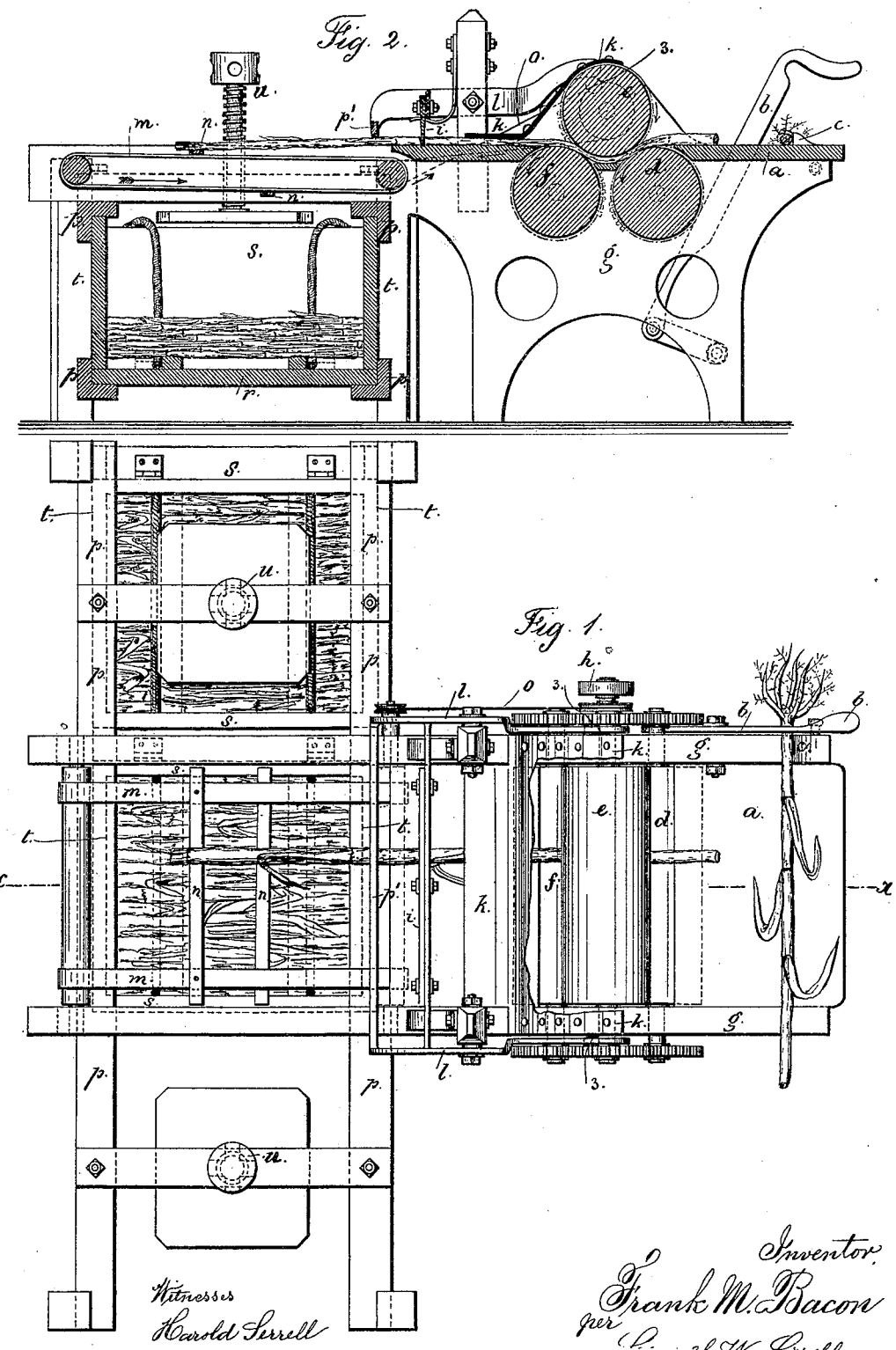
Witnesses
Harold Serrell
C. Roe H. Smith
Inventor
Frank M. Bacon
per Lemuel W. Serrell
atty

United States Patent Office.

FRANK M. BACON, OF PLAINFIELD, NEW JERSEY, ASSIGNOR TO HIMSELF, JOSEPH FOWLER, AND CARMAN PARSE, OF SAME PLACE.

FODDER-PRESS.

SPECIFICATION forming part of Letters Patent No. 252,922, dated January 31, 1882.

Application filed July 8, 1881. (No model.)

*To all whom it may concern:*

Be it known that I, FRANK M. BACON, of Plainfield, in the county of Union and State of New Jersey, have invented an Improvement in Presses for Preparing Cornstalk-Fodder for Transportation, of which the following is a specification.

It is well known that cornstalks form excellent fodder for cattle; but in consequence of the difficulty of transportation much of this valuable material is either burned up or else allowed to rot.

My invention is made for improving the cornstalks themselves and rendering them better adapted to use for fodder, and for baling the same in such a manner that the stalks and leaves are compact and easily handled in transportation.

I am aware that hay has been passed through rollers to flatten the same, and also that cornstalks have been shredded or cut up to improve it as fodder. These points therefore do not form the subject of my invention.

In the drawings I have represented the machinery that is adapted to the carrying out of my invention.

Figure 1 is a plan view, and Fig. 2 is a vertical section at the line $x\ x$.

The cornstalks and leaves are laid upon the feeding-table $a$, and if there are any roots or excrescences the same are to be cut off. This may be done by a hatchet; but I provide a swinging knife, $b$, at the side of the platform or table $a$ as the more convenient device, there being a projection, $c$, at the edge of the table to support the stalk while the knife $b$ is moved for cutting off such root.

I provide three rollers, $d\ e\ f$, that are set in bearings upon a suitable frame, $g$. The bearings for the roller $e$ should be provided with springs, so that the same can yield and rise for passing any obstruction through between the rollers without breaking the same. The rollers $e$ and $f$ should be closer together than the rollers $d$ and $e$, so that the cornstalks passed through between these rollers will be thoroughly flattened and crushed. The rollers $d\ e\ f$ are connected by gearing and driven by suitable power applied to the pulley $h$, or otherwise. There is a hood, $k$, over the rollers to give direction to the crushed stalks as they pass from the rollers. I cut off these stalks in suitable lengths to form bundles and bale the same for transportation. To accomplish this object I make use of a knife, $i$, operated periodically. I prefer to support this knife upon levers $l$, to which motion is given by cams 3 upon the gear-wheels or shaft of the roller $e$, so that said knife will be brought down upon the stalks once each revolution of such roller $e$ and cut them into lengths that correspond to the circumference of such roll $e$; and these crushed cornstalks, cut into lengths as aforesaid, are received into a press-box and put up into bales.

In order to facilitate the baling operation I make use of endless belts $m$, with cross-pieces $n$, that are moved by the belt $o$ or other connection to the roller $e$, and the parts are placed so that the cross-piece receives the advancing ends of the stalks and holds them up while they pass across the space in which is contained the press-box, and after the stalks have been cut off in the proper lengths by the knives they drop down into the press-box. The check-bar $p'$ across behind the cutter, and fastened to it, prevents the stalks springing up suddenly after being pressed down by the knife in cutting them off.

Any suitable press-box may be made use of. I have shown the frames $p\ p$ as adapted to receive the press-boxes composed of the bottom pieces, $r$, ends $s$, and sides $t$; and there are two such press-boxes shown, so that when one is filled it may be moved away from beneath the belt $m$ for the pressing and bundling to be done while the other box is being filled.

Followers and press-screws are shown at $u$, by means of which the bales are to be consolidated, after which the ends of the press-box are opened and wires or ropes passed around the bale and secured.

As there are many ways of baling that are well known and might be adapted for baling cornstalks, I do not describe the same more fully, and I do not intend to be limited in these particulars.

I remark that in feeding the stalks into the machine some should be passed in butt first and others top first, so that the material in the bale may be uniform, or nearly so, in its bulk.

If desired, two crushing-machines may be placed, one at each side of the baling mechanism, the stalks all being fed in butt first, and hence equalizing themselves in the bale.

The cornstalks are better for fodder in consequence of being crushed, the uneaten portions rot more quickly than the uncrushed stalks, and the bales are compact and easily transported.

It will be evident that this machine is adapted to crush, cut into lengths, and press sorghum, long grasses, and similar vegetable substances.

I claim as my invention—

1. The combination, in a machine for preparing cornstalks or similar material, of a table for receiving the stalks, three rollers for crushing the stalks, a cutter and mechanism for actuating the same automatically, and a press-box and means for pressing and baling the stalks, substantially as set forth.

2. The combination, in a machine for preparing cornstalks or similar material, of a feed-table, crushing-rollers, a cutter actuated automatically for separating the stalks into lengths, endless belts and cross-bars for supporting the advancing ends of the stalks, a press-box for receiving the stalks, and pressing mechanism, substantially as set forth.

Signed by me this 30th day of June, A. D. 1881.

FRANK M. BACON.

Witnesses:
GEORGE P. SUYDAM,
JOHN H. JACKSON.